Nov. 4, 1969 A. J. TEUBER 3,475,782

MAGNETIC TAPE CLEANER

Filed Dec. 4, 1967 3 Sheets-Sheet 1

*INVENTOR.*

ANTHONY J. TEUBER

*BY*

SOKOLSKI & WOHLGEMUTH

ATTORNEYS

INVENTOR.
ANTHONY J. TEUBER
BY
SOKOLSKI & WOHLGEMUTH
ATTORNEYS

INVENTOR.
ANTHONY J. TEUBER
BY
SOKOLSKI & WOHLGEMUTH
ATTORNEYS

United States Patent Office 3,475,782

Patented Nov. 4, 1969

3,475,782

MAGNETIC TAPE CLEANER

Anthony J. Teuber, Northridge, Calif., assignor, by mesne assignments, to Data Devices, Inc., Santa Monica, Calif.

Filed Dec. 4, 1967, Ser. No. 687,670
Int. Cl. A47l 5/38, 15/00
U.S. Cl. 15—308 6 Claims

ABSTRACT OF THE DISCLOSURE

A magnetic tape cleaning device comprised of a cylindrical tube having a plurality of slots therein, such that the edges of the slots form cutting edges for cleaning a magnetic tape. The cylindrical tube is preferably driven counter to movement of magnetic tape past it, scraping material from the tape. Additionally, a vacuum line is provided to withdraw the particles cleaned from the tape away from the tape and the cleaning tube.

The removal of dirt from magnetic tapes is extremely important in today's utilization of magnetic tapes for applications such as analog, digital computers as well as audio and video recordings. The magnetic tape tends to pick up particles of dirt and oxide from its own surface, which causes errors on the tape. These dirt or oxide formed areas tend to move the tape away from the read head causing a break in the readout, or alternatively in the recording. This is a very critical problem in view of the fact that a non-read area as little as .001 inch can cause a serious interruption in the readout of the device.

The problem with regard to the accumulation of dirt and oxide has been well recognized in the art. One method for cleaning the tape has been to pass the tape over a single blade which scrapes the surface of the tape. However, the problem with this device is that the blade rapidly dulls and needs to be replaced frequently. There is such a heavy blade wear problem due to the hardness and roughness of the oxide coatings on the tape. Additionally, loose oxide particles tend to become welded to the tape surface as a result of the high temperatures generated at the readhead due to friction with the high-speed transport. Thus, due to the combination of the welded loose oxide particles and the oxide coating on the tape, even single blades made of high strength alloys tend to wear rather rapidly. Additionally, with a single blade there is a limited cleaning surface contact involved since the blade only presents a single narrow edge to the tape.

Another method for cleaning in an attempt to counteract some of the effects of the single edge blade is a rotary blade in the form of a rotating conical solid section. However, there is a tendency for this type of blade to warp the tape in view of the tape being directed over the conical surface. Further, there is only a single blade edge for cleaning the surface as with the non-rotating single edge blade. Finally ultrasonic cleaning has been utilized but this is extremely expensive and complicated.

Thus it is an object of this invention to provide a device for cleaning magnetic tapes which is self-sharpening.

Another object of this invention is to provide a device for cleaning magnetic tapes which maintains several cleaning surfaces in contact with the tape.

Still another object of this invention is to provide a device for cleaning magnetic tapes which is of simple construction.

One further object of the invention is to provide a device for cleaning magnetic tapes which provides for the removal of the particles cleaned from the tape.

Still one further object of this invention is to provide a device for concurrently clearing the non-magnetic side of magnetic tape.

The above and other objects of this invention are accomplished by the device of this invention wherein magnetic tape is forced to pass over a cylindrical tube which has a plurality of slots formed therein. The slots are formed parallel to the axis of the tube and are spaced at intervals about the entire circumference. As the tape is passed over the tube, several of the slots are in contact with the same area of tape. Preferably, the cylinder is driven oppositely to the directional movement of the tape in order to achieve the cleaning action. A vacuum line is preferably connected to an aperture provided at the base of the cylinder, which serves to withdraw the particles cleaned from the tape. The cylinder and the vacuum line are utilized in a conventional deck arrangement wherein means is provided for reversibly driving two reels of magnetic tape so that the tape can be cleaned passing over the cylinder in two directions. Additionally, the deck for rotating the tape past the cleaning cylinder can be provided with photoelectric means to sense beginning and ending and relate the sensing to means for reversing the tape direction when the tape has come to an end of one reel. Additionally, means are provided for assuring good contact between the tape and the cleaning cylinder. Further, a rotating brush wheel cleans the back or non-magnetic side of the tape and vacuum means withdraws the cleaned material.

It is believed the invention will be better understood from the following detailed description and drawings in which.

Figure 1:
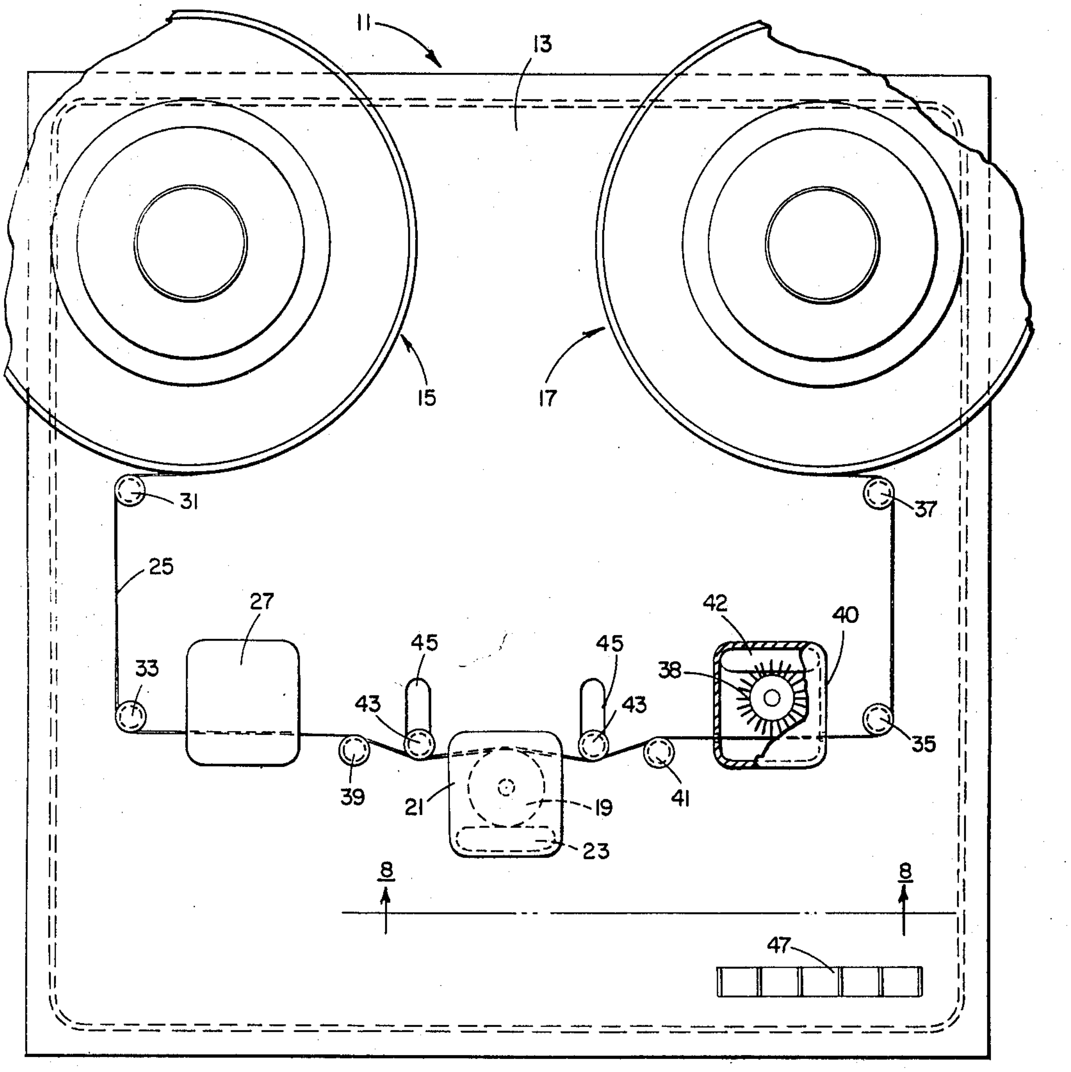
FIG. 1 is a top plane view of the entire tape cleaner device and transport of this invention.

Turning now to FIG. 1 there is seen a tape transport 11. The entire device has a top cover plate 13 on top of which are mounted take-up reels 15 and 17 respectively. As will be later explained, the take-up reels are reversible so that the tape can move bidirectionally past the cleaning element. A cleaning tube 19 of this invention is medially disposed between the take-up reels 15 and 17 and surrounded by a housing 21. Adjacent the base of the cleaning tube 19 is a slot 23 which is connected to a vacuum line (not seen in this view) for removing the dirt particles that have been cleaned from the tape 25 as it passes over the cleaning tube 19. Located on one side of the cleaning tube 19 is housing 27 which contains a photoelectric cell (not seen) for sensing the end of the tape to effect an automatic reversal of the take-up reels 15 and 17. This feature is conventional and found in both cleaning devices and recorders. Guide rollers 31 and 33 guide the tape from reel 15 past the photoelectric cell contained in housing 27, while guide rollers 35 and 37 maintain the same function relative to take-up reel 17. A driven brush roller 38 in housing 40 cleans the back or non-magnetic side of the tape. A slot 42 is provided to withdraw dirt particles into a vacuum line (not seen in this view). The tape 25 if forced into close tangential contact with the cleaning tube 19 by means of guide rollers 39 and 41 outwardly disposed from a pair of adjustable rollers 43, which move in slots 45. This arrangement once again is conventional in the art of tape recorders and forms no part of the herein invention but is useful for maintaining a necessary contact between the tape 25 and the cleaner tube 19. A control panel comprised of a plurality of buttons 47 is used to select the desired mode of operation for the entire device.

Figure 3:
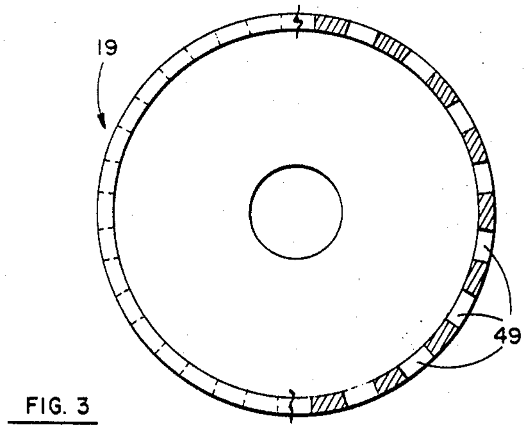
FIG. 3 is a top view of FIG. 2.
Figure 2:
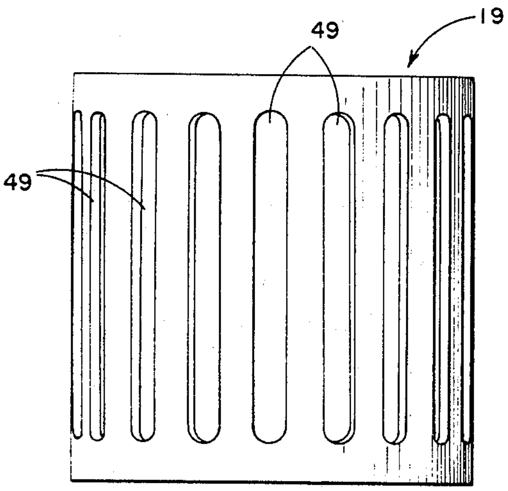
FIG. 2 is a pictorial representation of the cleaner tube of this invention.

Turning now to FIGS. 2 and 3, there is seen the cleaning wheel 19 of this invention which is a cylindrical tube having a plurality of vertical slots 49 formed therein. The edges of the slots perform the cleaning action with regard to the tape. Thus, as can be seen, there is a plurality of cleaning or cutting surfaces presented to the tape as the tape rotates past the revolving tube 19 in the operation of the device. Since the tape is passed tangentially to the cylindrical surface of the cleaner, the surface will be worn down evenly. Thus all the cutting edges are worn evenly and are self-sharpening. In view of this there are virtually no dulling problems encountered. Further, since the tape moves over a portion of a cylindrical surface there is no warpage involved. Another advantage, as can now be readily seen, is that since the cleaner tube 19 is driven counter to the movement of the tape, a plurality of cutting edges pass a given point of the tape at one pass, providing for superior cleaning action. The number of slots 49 is not critical. Generally the number of slots will be commensurate with that needed to achieve an even and smooth transport of the tape past the cleaner tube 19. Too many slots can cause an erratic and uneven transport. The tubular cleaner 19 must be fabricated of a non-magnetic material. A good example of such a composition is beryllium-copper alloy. The material of construction need not be extremely hard in view of the previously mentioned self-sharpening aspect, thus giving further latitude toward a choice of material. Obviously the length of the cylinder is sufficient so that the slots 49 will more than cover the width of the magnetic tape 25.

Figure 4:
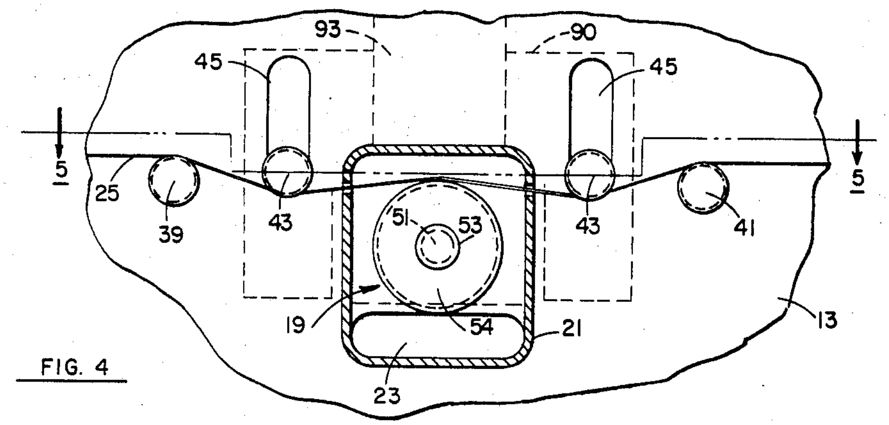
FIG. 4 is a partially sectioned view of the cleaner tube in relation to the magnetic tape.
Figure 6:
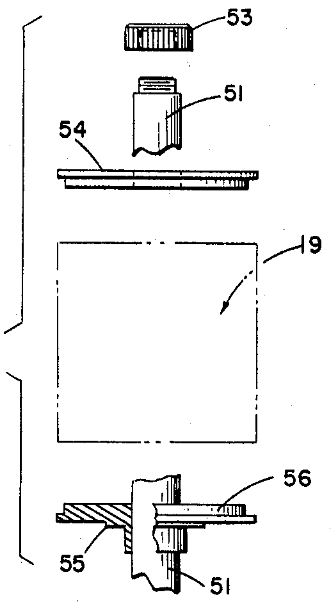
FIG. 6 is an exploded view of the cleaner tube assembly.
Figure 5:
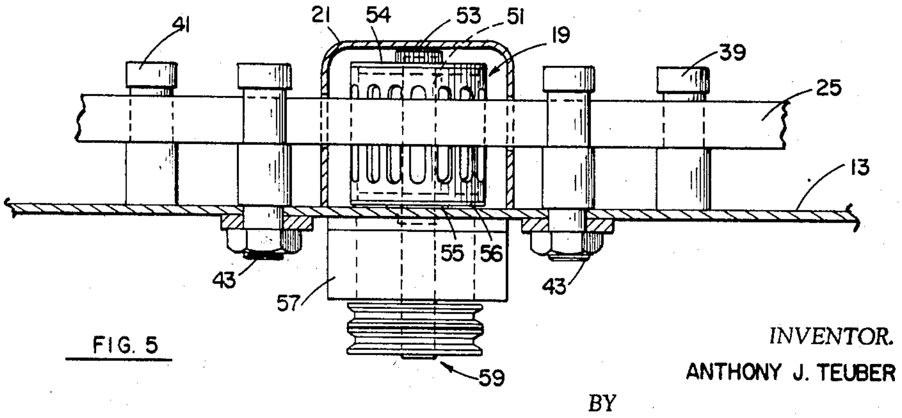
FIG. 5 is taken along line 5—5 of FIG. 4.

The details and the positioning of the tubular cleaner 19 of the invention is particularly shown in FIGS. 4, 5, and 6. The tube 19 is mounted on an axle 51 passing through its center axis. At the top of the tube 19 a lock nut 53 engages the exposed portion of the axle 51 and maintains tight engagement between the axle and the top surface plate 54 of the tube. The axle 51 is tight-fitted in apertures formed in the top and bottom plates of the tube 19 so that rotation of the axle causes rotation of the tube. Likewise, a spacer washer 55 is disposed between the bottom plate 56 of the tube 19 and the cover plate 13 to prevent any frictional engagement between the two. Axle 51 extends through the cover plate 13 passing through a sleeve bearing 57, terminating in a double pulley assembly 59.

Figure 8:
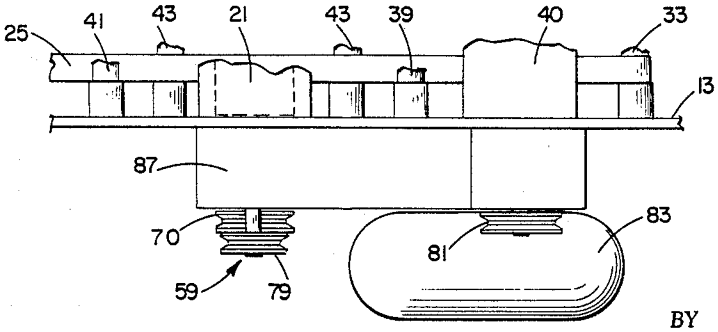
FIG. 8 is a partially sectioned view taken along line 8—8 of FIG. 1.
Figure 7:
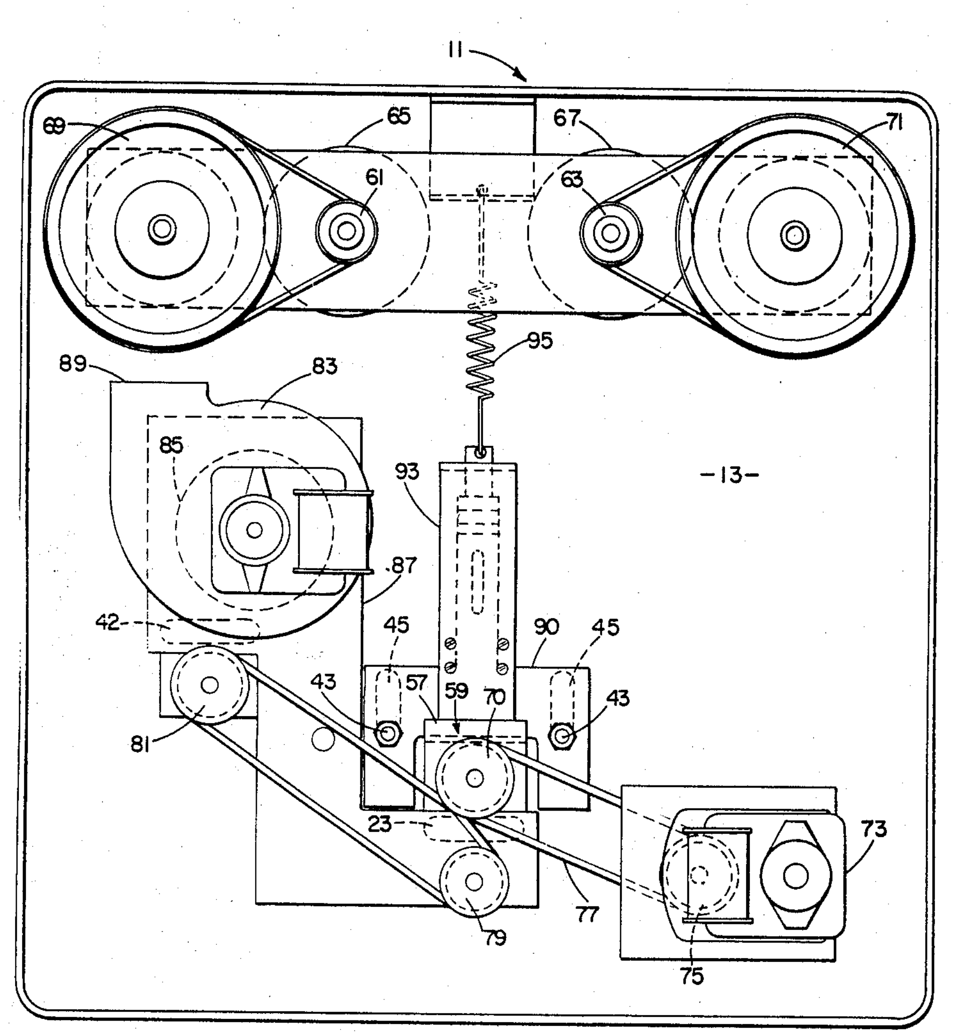
FIG. 7 is a bottom plan view of the device of the invention with the top cover removed disclosing the various drive means.

Turning now to FIGS. 6, 7, and 8 it is seen that small pulleys 61 and 63, driven by motors 65 and 67 respectively, in turn belt drive large pulleys 69 and 71 which in turn cause the reels 17 and 15 respectively to move in the desired direction. Means (not shown) are provided for effectively reversing motors 65 and 67 in response to the photoelectric cell 27 so that tape can be bidirectionally moved past the cleaning head. When the end of a tape is reached the cells sense this and effect a reversal. Additionally, a reversible motor 73 rotates an associated pulley 75 which drives belt 77 over the top pulley 78 of pulley assembly 59 affixed to the cleaning head 19, and idler 79 and a pulley 81 which is connected to the rotating brush 38. Motor 73 is responsive by means not shown to the photoelectric cell so as to reverse the direction of rotation of pulley assembly 59 and associated cleaning head 19, depending upon the movement of the tape. As indicated, motor 73 will rotate pulley assembly 59 in a direction counter to the movement of the tape. This assures that several blades come in contact with the tape as it passes over the cleaning head, especially if the cleaning head is rotated at a slightly faster rate than the movement of the tape. An example of the speed of rotation of cleaning head 19 is 140 r.p.m. A centrifugal turbine in housing 83 is driven by motor 85. This fan is used to establish the vacuum for removing dirt particles from brush reel 38 and the cleaning head 19. Duct work 87 connects the turbine housing 83 to inlet 23 for the cleaning tube 19 and inlet 42 for the brush reel 38. As a result, the turbine draws the particles through the respective slots 23 and 34 and blows the air out exit 89 continually providing a means for removing the dirt particles.

Adjustable idler rollers 43 are affixed to slidable plate 90. The plate 90 in turn is connected to a solenoid 91 in housing 93. Upon actuation of solenoid 91 the plate 90 slides forward in slots 45 to the position shown in the drawing. Upon release of the solenoid, spring 95 withdraws the plate from its downward position, pulling the idler rollers 43 away from the tape to the rear of the slots 45.

While the device of the invention has been described and illustrated in detail, it is to be clearly understood that this is intended for the purposes of illustration and example only and is not to be taken by way of limitation.

I claim:

1. In a device for cleaning magnetic tape comprising: means for transporting tape from a first to a second take-up reel, a rotatable tubular cleaning element having a plurality of sharp-edged continuous axial slots through the walls thereof, wherein each slot has a length greater than the width of the tape to be cleaned, means for directing tape to be cleaned past said cleaning element and in contact therewith, whereby the incoming and outgoing tape is directed below the periphery of said cleaning element, and means for rotating said cleaning element counter to the direction of movement of tape over it at a rotational speed greater than the speed at which the tape is directed over the cleaning element sufficient for said slots to contact the entire surface of the tape to be cleaned.

2. The device of claim 1 additionally comprising: vacuum means adjacent said cleaning element for withdrawing particles cleaned from said tape.

3. The device of claim 1 additionally comprising: a rotatable brush disposed in the device between said reels whereby the tape to be cleaned is forced to continually contact the bristles.

4. The device of claim 3 wherein said brush is disposed on said device so as to contact the opposite side of the tape from the side cleaned by said cleaning element.

5. The device of claim 3 additionally comprising means for rotating said brush counter to the direction of movement of tape past it.

6. The device of claim 3 additionally comprising: vacuum means adjacent said brush for withdrawing particles cleaned from said tape.

References Cited

UNITED STATES PATENTS

| | | | |
|---|---|---|---|
| 3,035,295 | 5/1962 | Buslik et al. | 15—93 |
| 3,341,882 | 9/1967 | Morello | 15—306 |
| 3,266,196 | 8/1966 | Barcaro | 51—135 |
| 3,091,794 | 6/1963 | Pillsbury | 15—308 |

LEONARD FORMAN, Primary Examiner
F. J. D'AMBROSIO, Assistant Examiner

U.S. Cl. X.R.

274—47; 15—100